July 15, 1958 P. W. JOHNSON 2,842,862
LEAD TESTING GAGE FOR THREADS AND A LEAD TESTING ROLL
Filed July 24, 1956 2 Sheets-Sheet 1
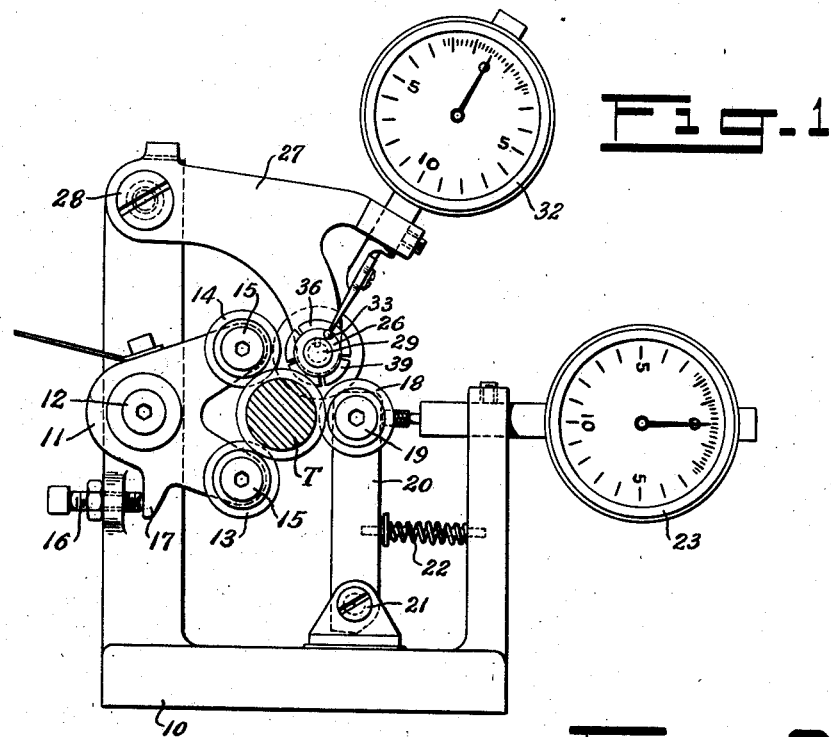
Fig. 1
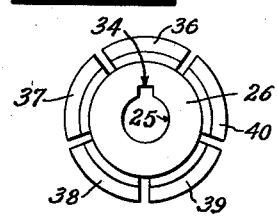
Fig. 3
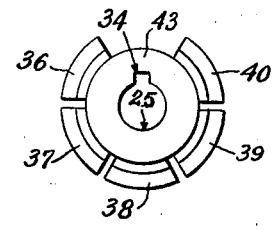
Fig. 4
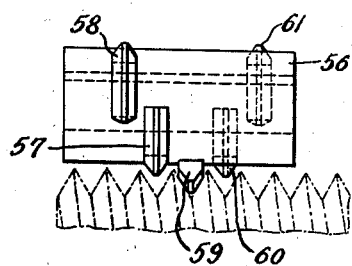
Fig. 2
Fig. 7
INVENTOR.
PAUL W. JOHNSON
BY
ATTORNEYS July 15, 1958 P. W. JOHNSON 2,842,862
LEAD TESTING GAGE FOR THREADS AND A LEAD TESTING ROLL
Filed July 24, 1956 2 Sheets-Sheet 2
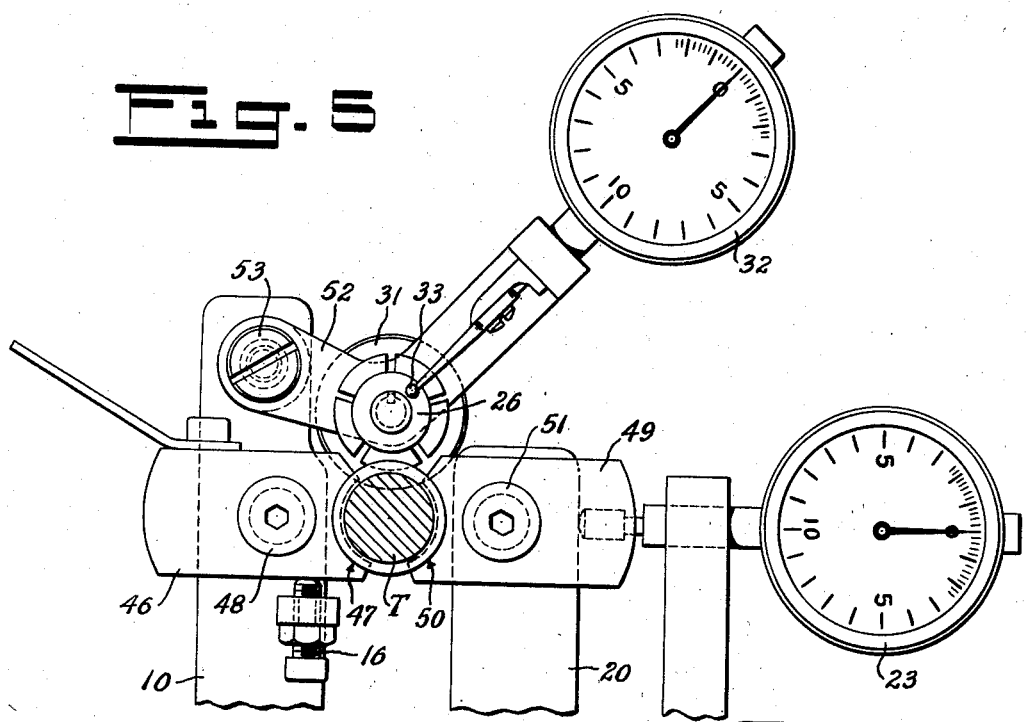
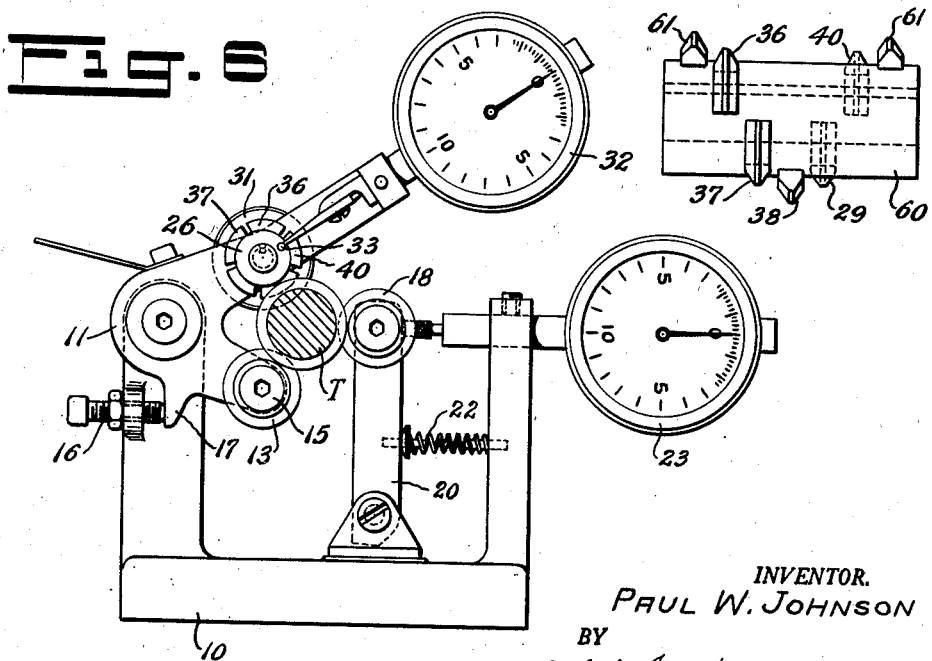
INVENTOR.
PAUL W. JOHNSON
BY
Bohleber, Jasse H & Montstream
ATTORNEYS

United States Patent Office 2,842,862
Patented July 15, 1958

2,842,862
LEAD TESTING GAGE FOR THREADS AND A LEAD TESTING ROLL

Paul W. Johnson, Bloomfield, Conn., assignor to The Johnson Gage Development Company, Bloomfield, Conn., a corporation of Connecticut Application July 24, 1956, Serial No. 599,835

10 Claims. (Cl. 33—199)

The invention is directed to a gage for testing the lead of a screw thread on a test part. The lead testing means may be used with any structure for supporting the test part in gaging position. The lead testing means, however, is more useful when it is used in conjunction with a comparator type or gage which also gages the test thread as to its diameter or overall assemblability. The comparator type of gage of any construction is suitable for having the lead testing means associated therewith and test as to the lead of the thread while the test part is supported in gaging position in the comparator type of gage and gaged for assemblability.

It is an object of the invention to construct a gage which tests the lead of a screw thread on a test part at a plurality of points axially of the thread.

It is another object of the invention to construct a lead testing means which tests a screw thread for lead at a plurality of points axially of the thread in combination with a screw thread gage which at the same time tests the thread for its assemblability.

Another object is to construct a lead testing gage in which a new form of a lead testing roll is one of the gaging rolls of a roll gage for testing assemblability of the screw thread.

Another object of the invention is to construct a lead testing roll which will test a screw thread at a plurality of points axially of a screw thread.

A still further object is to construct a lead testing roll particularly suited for use as one of a plurality of gaging rolls in a screw thread comparator gage.

Other objects of the invention will be more apparent from the following description when taken in connection with the accompanying drawings which illustrate some preferred embodiments of the invention in which:

Fig. 1 is a side elevation of a thread gage of the comparator type with the lead testing means associated therewith;

Fig. 2 is an enlarged plan view of a lead testing roll for screw threads;

Fig. 3 is an enlarged end view of a lead testing roll;

Fig. 4 is an enlarged end view of a lead testing roll having a gap in the periphery thereof;

Fig. 5 is a side elevation of a portion of a comparator type of screw thread gage having concave thread engaging surfaces carried by pivoted segments with the lead testing means associated therewith;

Fig. 6 is a side elevation of a gage in which the screw thread comparator gage is similar to that of Fig. 1 but shows a lead testing roll mounted as one of a plurality of rolls of the thread comparator gage;

Fig. 7 is a plan view of a lead testing roll in which the adjacent ridge means overlap at their ends; and Fig. 8 is a plan view of a lead testing roll which has a pair of spaced ridge means in axial alignment in one peripheral position.

There are gages which test the lead of a screw thread on a test part. These gages, however, use a pair of rolls which are spaced apart and include therebetween a plurality of ridges of the thread so that the lead test which is made would be the cumulative error of the lead and effects the spacing of the rolls. The lead testing means, herein for a screw thread, individually tests the lead error of each thread ridge or thread groove separately or independently over a length of the thread at predetermined spaced intervals of the thread. The gage may also gage the screw thread of a test part for its overall assemblability with a mating internal thread as well as a plurality of individual tests of lead error axially of the thread.

The gage in one simple form includes means for supporting a test part in gaging position and provides a space between supporting means so that the lead testing roll may be brought into contact with the thread. It is desirable and advantageous to use a lead testing means with a gage which also tests a thread with respect to its overall assemblability. In its broader aspect, this need not be a comparator type of gage. A more useful form of the gage mounts the lead testing means with a comparator type of gage as illustrated which not only tests the screw thread for its overall assemblability but at the same time supports the test part in gaging position so that the lead testing roll may be used while the test thread is in this gaging position.

The gage shown in Fig. 1 includes a mounting frame 10. The mounting frame carries a pivoted frame 11 mounted on a pivot 12. The pivoted frame carries a pair of spaced thread gaging rolls 13 and 14, each mounted for rotation on its own pivot 15. Suitable means are provided to stop the rotation of the pivoted frame 11 when the gaging rolls 13 and 14 are in gaging position. The stop means particularly illustrated is a screw 16 threaded into the frame 10 which is engaged by a stop 17 on the pivot frame 11. The two gaging rolls are spaced apart so that they engage a screw thread on a test part T at points spaced 120° around the periphery of the thread.

Cooperating gaging means is carried by the mounting frame for cooperating with the gaging rolls 13 and 14. This cooperating gaging means includes at least one roll. The cooperating gaging means particularly illustrated is a single roll form including a third gaging roll 18 mounted for rotation on a pivot 19. For a limit gage this roll is fixed, that is, it has no movement towards and away from the pair of gaging rolls. For a comparator type of gage the gaging roll 18 is carried by a lever 20 which is carried on the mounting frame 10 on a pivot 21 so that the gaging roll 18 may move towards and from a test part in accordance with the diameter thereof. A spring 22 may press the roll 18 towards the test part supported within or between the gaging rolls. An indicator 23, shown as a dial indicator, is carried by the mounting frame 10 and engages a suitable part of the structure of the cooperating gaging means such as the pivoted lever 20.

With three gaging rolls supporting the test part in gaging position there is ample space therebetween exposing a sufficient portion of the periphery of the test part so that a lead testing means may be movable into position therebetween and gage the test thread as to its lead. The lead testing means is a lead testing roll 26 mounted in any suitable way on an arm 27 so that the roll may be rotated and is freely movable axially. The arm is pivotally carried on a pivot 28 carried by the mounting frame 10. The means particularly shown for rotatably mounting the lead testing roll or means is a pin or shaft 29 rotatably mounted in the arm 27 and received in a bore 25 in the roll. The pin carries a key 30 which is received in a key way 34 so that rotation of the pin rotates the lead testing roll therewith. The lead testing roll is mounted upon the pin for free axial movement thereon. The lead testing roll may be rotated by turning the same with a finger or fingers, however, it is more convenient to provide a knob 31 secured to the pin 29 and located on the other side of the arm 27 from the lead testing roll. An indicator 32 is carried by the arm and is controlled by the axial movement of the lead testing roll. This control may be secured in simple fashion by having the contact 33 of the indicator engage one of the ends of the lead testing roll.

The lead testing roll has on its periphery thread engaging ridge means 36, 37, 38, 39 and 40. There are five such ridge means particularly shown although it is clear it may include any desired number depending upon the length of thread to be gaged as to its lead. The ridge means particularly shown is a single ridge and hence engages the flanks of the thread ridge in a single thread groove. Each ridge means is spaced peripherally at least over a major portion of its length from all of the other ridge means and in succession with respect to its adjacent ridge means. The ridge means are also staggered or spaced axially with respect to all of the other ridge means and are spaced axially in succession. Although the ridge means are spaced axially the distance of one thread groove, it is clear that in this, and in any of the lead testing rolls, the spacing may be such as to engage every alternate thread groove or ridge or any desired spacing.

In the use of the gage with the lead testing means or roll associated therewith, the lead testing roll 26 is pivoted to an upward position, and the gage rolls 13 and 14 with their pivoted frame are pivoted to an upward position. A test part T is inserted between the two gaging rolls 13 and 14 and the rolls and frame pivoted downwardly until the stop 17 engages the screw 16 whereupon the test part T is in gaging position and is engaged by the three gaging rolls 13, 14 and 18. In this position the indicator 23 gives an indication or comparison of the screw thread of the test part with respect to a master or perfect thread. If the screw thread is within allowable tolerances it is known that this thread will properly engage an internal thread such as a nut.

While the test thread is in gaging position the lead testing roll 26 and its arm 27 are pivoted downwardly so that the first ridge means 36 engages in the groove of the screw thread. The lead testing roll is then turned by the knob 31 so that each ridge means engages in its respective groove of the screw thread on the test part. As each ridge means engages its respective thread groove the reading of the indicator 32 is noted. Assume that the lead of the test thread is uniformly greater than that of a master or perfect thread in which event the ridge means 36 when it engages its thread groove will be shifted to the left and hence shift the entire lead testing roll therewith. This axial movement of the thread ridge and roll will appear on the indicator because its contact 33 engages the end of the roll. Upon the ridge means 37 being brought into engagement with its thread groove the reading will be less. With the center ridge means 38 engaging its thread groove there will be a zero reading on the indicator. With the ridge means 39 moved into its thread groove the pointer will give a reading on the other side of zero of the dial indicator. The reading for the last ridge means 40 will be an even greater reading. It will be observed, therefore, that a lead indication or gaging has been secured with respect to each thread groove. The overall lead error is the sum of the two maximum readings.

For a lead in the test thread which is less than that of a perfect thread, the readings on the indicator will begin from the other side of the indicator to zero and then to the same side or zero indicator reading as for the oversize lead. In other words, the readings will be in the opposite direction to that for a test part having a lead larger than that of a perfect thread. So the direction of the readings tells the inspector whether the lead error is over or under a perfect lead.

Any lead error which does not extend the full length of the thread will also be revealed by the indicator in which even the indicator will have a number of zero readings for the perfect portion of the thread and any subsequent threads having a lead error will provide its lateral movement of the lead testing roll which lateral movement will be indicated by a shifting of the pointer from its zero position. The lead testing roll will also indicate a stagger thread by turning the test part to bring another portion of the periphery of the test thread into lead testing position. If the readings are different it will indicate a stagger thread.

It is not necessary that the ridge means go around the entire periphery of the lead testing roll. Fig. 4 shows a lead testing roll 43 which has five ridge means spaced around its periphery, and also spaced laterally and successively with respect to each other in the manner shown in Fig. 2. The gap between ridge means 36 and 40 will enable the lead testing roll to be brought into gaging position without initially engaging any ridge means. With this roll the ridge means is the same as that described in connection with the construction of Figs. 1, 2 and 3.

The lead testing means may be used with a type of gage illustrated in Fig. 5 in which one of the gaging members for gaging overall assemblability of the test part T is a pivoted gaging member 46 having a concave gaging surface 47. The pivoted gaging member is pivotally mounted on the frame 10 by a pivot 48. A cooperating pivoted gaging member 49 has a concave gaging surface 50 and is spaced from the gaging member 46. The gaging member 49 is pivotally mounted on the lever 20 by means of the pivot 51. The upper gap between the concave gaging surfaces is widened to provide sufficient space or expose enough of the periphery of the screw thread for receiving a lead testing roll. This lead testing roll 26 is identical with and similarly mounted to that illustrated in Figs. 1, 2 and 3. It is carried on an arm 52 pivotally mounted on a pivot 53 carried by the frame 10. The lead testing indicator 32 is carried by the arm 52 and its contact 33 engages the end of the lead testing roll 26. The gaging operation with the gage of Fig. 5 is the same as that described in connection with the gage of Fig. 1. The lead testing roll is pivoted out of the way and the engaging member or segments 46, 49 are pivoted upwardly so that a test part may be inserted therebetween. Pressing the test part or gaging members downwardly to gaging position, the gaging members pivot until the stop screw 16 is reached whereupon the test part is in gaging position and the indicator 23 will indicate the overall assemblability of the test part with respect to a threaded hole. The lead testing roll is then brought into contact with the thread of the test part and the roll is rotated by the knob 31 to bring each of the ridge means in contact with its respective thread groove of the test part. Any variations in the lead of the thread from that of a perfect thread will be shown on the indicator 32.

There is shown in Fig. 6 a gage of the comparator type illustrated in Fig. 1. In the gage here shown, however, the lead testing roll is mounted on the pivoted frame 11 in the position occupied by the gaging roll 14. In other words, the lead testing roll may also serve as one of the gaging rolls of a comparator gage for testing the overall assemblability of the test thread T and may also serve as a test for lead error. The operation of this gage is as described in connection with Fig. 1, namely the pivoted frame 11 is pivoted upwardly so that the test part may be inserted in contact with the gaging rolls 13 and 26 whereupon the test part T and frame 11 are pivoted downwardly until the stop screw 16 is engaged whereupon the test part is in gaging position. The cooperating gaging means or roll 18 will engage the test part and any variation of the test thread with respect to a perfect thread will be indicated on the indicator 23. The lead testing roll 26 may then be rotated by the knob 31 to bring each ridge means into contact with its respective thread groove. Any deviation of the lead of the thread from that of a master or perfect thread will axially move the lead testing roll and such movement will be indicated on the indicator 32. This indicator is carried on the pivoted frame 11 since the lead testing roll is also carried on this pivoted frame.

In Fig. 7 there is shown a lead testing roll 56 having ridge means 57, 58, 59, 60 and 61 spaced peripherally around the roll and successively with respect to its adjacent ridge means and also spaced axially with respect to each other and successively with respect to its adjacent ridge means. The ends of these ridge means overlap so that in the region of overlap there is a so-called V-ridge means which engages opposite flanks of one thread ridge on the test part. It is clear, therefore, that the ridge means may be in the form illustrated or may be a V-type similar to that secured between the overlapping ends of adjacent ridge means. With the overlap as particularly shown in Fig. 7 gaging may be secured of the groove or the flanks of adjacent thread ridges of the thread as well as the flanks of one ridge of the screw thread.

The lead testing roll 64 of Fig. 8 is a roll similar to that of Fig. 4 except that where a peripheral gap is shown therein, a pair of spaced ridge means 65 in axial alignment are provided for engagement of the test thread. There may be any number of ridge means in axial alignment in this position. This lead testing roll is particularly suited for a gage such as shown in Fig. 6 wherein the lead testing roll is one of the plurality of gaging rolls for a comparator or limit gage. For testing or gaging a thread for overall assemblability the roll is turned so that the ridge means 65 are positioned to engage the test part or thread and a reading secured on the indicator 23. Thereafter the roll is turned for engagement of the lead testing ridge means with its respective thread for testing the lead of the screw thread.

This invention is presented to fill a need for improvements in a lead testing gage for threads and a lead testing roll. It is understood that various modifications in structure, as well as changes in mode of operation, assembly, and manner of use, may and often do occur to those skilled in the art, especially after benefiting from the teachings of an invention. Hence, it will be understood that this disclosure is illustrative of preferred means of embodying the invention in useful form by explaining the construction, operation and advantages thereof.

What is claimed is:

1. A gage for testing the screw thread on a test part comprising a mounting frame, means carried by the mounting frame for supporting the test part in gaging position and exposing a portion of the periphery of the test part, a lead testing roll, means mounting the lead testing roll for engagement of the exposed portion of the thread of the test part and for rotation and for free axial movement, the lead testing roll having a plurality of thread engaging ridge means around its periphery, at least the major portion of each ridge means being peripherally spaced from the other ridge means and spaced successively from its adjacent ridge means, each ridge means being spaced axially on the periphery from all other ridge means and successively from its adjacent ridge means, and an indicator controlled by the axial movement of the lead testing roll to indicate the movement thereof.

2. A gage as in claim 1 in which the means mounting the lead testing roll includes an arm, a pivot mounting the arm to the mounting frame with the lead testing roll spaced from the pivot to move the lead testing roll to and away from gaging position, and the indicator being mounted on the arm.

3. A gage as in claim 1 in which the ridge means are disposed around the periphery to leave a peripheral gap between ridge means at opposite ends.

4. A gage as in claim 1 in which the ridge means are peripherally spaced.

5. A gage as in claim 1 in which the adjacent ridge means peripherally overlap at their ends.

6. A gage for testing the screw thread on a test part comprising a mounting frame, means carried by the mounting frame supporting the test part in gaging position and exposing a portion of the periphery of the test part, a lead testing roll, means mounting the lead testing roll for engagement of the thread of the test part and for rotation and for free axial movement, including an arm pivotally mounted on the mounting frame for movement of the lead testing roll towards and away from gaging position, the lead testing roll having a plurality of thread engaging ridge means around its periphery, at least the major portion of each ridge means being peripherally spaced from the other ridge means and spaced successively from its adjacent ridge means, each ridge means being spaced axially on the periphery from all other ridge means and successively from its adjacent ridge means, and an indicator controlled by the axial movement of the lead testing roll to indicate the movement thereof.

7. A gage for testing the screw thread on a test part comprising a mounting frame, means carried by the mounting frame supporting the test part in gaging position, and exposing a portion of the periphery of the test part including a plurality of spaced gaging rolls to receive the test part and engage the test part in gaging position at a plurality of points around its periphery, one of said gaging rolls being a lead testing roll, means mounting the lead testing roll for rotation and for axial movement, the lead testing roll having a plurality of thread engaging ridge means around its periphery, at least the major portion of each ridge means being peripherally spaced from the other ridge means and spaced successively from its adjacent ridge means, each ridge means being spaced axially on the periphery from all other ridge means and successively from its adjacent ridge means, and an indicator controlled by the axial movement of the lead testing roll to indicate the movement thereof.

8. A gage as in claim 7 in which the lead testing roll includes at least two ridge means in axial alignment and axially spaced from each other.

9. A gage as in claim 7 including means mounting one of said gaging rolls for movement towards and away from gaging position, and an indicator carried by the mounting frame to indicate the movement thereof.

10. A gage as in claim 9 in which the lead testing roll includes at least two ridge means in axial alignment and axially spaced from each other.

References Cited in the file of this patent

UNITED STATES PATENTS

| | | |
|---|---|---|
| 2,577,819 | Short | Dec. 11, 1951 |
| 2,745,188 | Wills et al. | May 15, 1956 |
| 2,770,050 | Johnson | Nov. 13, 1956 |

UNITED STATES PATENT OFFICE

CERTIFICATE OF CORRECTION

Patent No. 2,842,862                                         July 15, 1958

Paul W. Johnson

It is hereby certified that error appears in the above numbered patent requiring correction and that the said Letters Patent should read as corrected below.

In the drawings, Sheet 2, Fig. 8, the reference numeral "29" should read -- 39 --; the two reference numerals "61" should read -- 65 --; the reference numeral "60" should read -- 64 --.

Signed and sealed this 28th day of October 1958.

(SEAL)

Attest:

KARL H. AXLINE
Attesting Officer

ROBERT C. WATSON
Commissioner of Patents